United States Patent
Gustavson et al.

(10) Patent No.: US 8,200,726 B2
(45) Date of Patent: *Jun. 12, 2012

(54) METHOD AND STRUCTURE FOR PRODUCING HIGH PERFORMANCE LINEAR ALGEBRA ROUTINES USING STREAMING

(75) Inventors: Fred Gehrung Gustavson, Briarcliff Manor, NY (US); John A. Gunnels, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 660 days.

This patent is subject to a terminal disclaimer.

(21) Appl. No.: 12/348,869

(22) Filed: Jan. 5, 2009

(65) Prior Publication Data

US 2009/0150615 A1     Jun. 11, 2009

Related U.S. Application Data

(63) Continuation of application No. 10/671,934, filed on Sep. 29, 2003, now Pat. No. 7,475,101.

(51) Int. Cl.
   G06F 15/00    (2006.01)
   G06F 7/52     (2006.01)
(52) U.S. Cl. .................. 708/200; 708/607
(58) Field of Classification Search .............. None
   See application file for complete search history.

(56) References Cited

U.S. PATENT DOCUMENTS

| | | |
|---|---|---|
| 5,025,407 A | 6/1991 | Gulley et al. |
| 5,099,447 A | 3/1992 | Myszewski |
| 5,513,366 A | 4/1996 | Agarwal et al. |
| 5,644,517 A | 7/1997 | Ho |
| 5,825,677 A | 10/1998 | Agarwal et al. |
| 5,944,819 A | 8/1999 | Kumar et al. |
| 5,983,230 A | 11/1999 | Gilbert et al. |
| 6,021,420 A | 2/2000 | Takamuki |
| 6,115,730 A | 9/2000 | Dhablania et al. |
| 6,357,041 B1 | 3/2002 | Pingali et al. |
| 6,470,368 B1 | 10/2002 | Garg et al. |
| 6,601,080 B1 | 7/2003 | Garg |
| 6,675,106 B1 | 1/2004 | Keenan et al. |
| 7,028,168 B2 | 4/2006 | Wadleigh |
| 7,031,994 B2 | 4/2006 | Lao et al. |
| 7,386,582 B2 * | 6/2008 | Gustavson et al. ........... 708/520 |
| 7,469,266 B2 * | 12/2008 | Gustavson et al. ........... 708/520 |
| 7,475,101 B2 * | 1/2009 | Gustavson et al. ........... 708/200 |
| 7,487,195 B2 * | 2/2009 | Gustavson et al. ........... 708/520 |

(Continued)

OTHER PUBLICATIONS

Philip et al., PLAPACK: Parallel Linear Algebra Package Design Overview, 1997, IEEE Proceedings of the ACM/IEEE SC 97 Conference.

(Continued)

*Primary Examiner* — David H Malzahn
(74) *Attorney, Agent, or Firm* — McGinn IP Law Group, PLLC

(57) ABSTRACT

A method (and structure) for executing a linear algebra subroutine on a computer having a cache, includes streaming data for matrices involved in processing the linear algebra subroutine such that data is processed using data for a first matrix stored in the cache as a matrix format and data from a second matrix and a third matrix is stored in a memory device at a higher level than the cache, the streaming providing data from the higher level as the streaming data is required for the processing.

18 Claims, 5 Drawing Sheets

U.S. PATENT DOCUMENTS

| | | | |
|---|---|---|---|
| 7,490,120 B2 * | 2/2009 | Gustavson et al. | 708/520 |
| 7,571,435 B2 * | 8/2009 | Gustavson et al. | 717/161 |
| 2003/0088600 A1 | 5/2003 | Lao et al. | |
| 2004/0148324 A1 | 7/2004 | Garg | |
| 2005/0071405 A1 * | 3/2005 | Gustavson et al. | 708/446 |

OTHER PUBLICATIONS

Agarwal et al., A High Performance Algorithm Using Pre-Processing for the Sparse Matrix-Vector Multiplication, 1992, IEEE, pp. 32-41.

Vinod et al., A Framework for high-performance matrix multiplication based on hierarchical abstractions, algorithms and optimized low-level kernels, 2002, Concurrency and Computation: Practice and Experience 14(10): 805-839.

"Improving performance of linear algebra algorithms for dense matrices, using algorithmic prefetch" R. C. Agarwal, F.G. Gustavson, M. Zubair: IBM Journal of Research and Development; vol. 38, Issue 3 (May 1994); pp. 265-275; Year of Publication: 1994.

Gunnels, et al., "A Family of High Performance Matrix Multiplication Algorithms", ICCS 2001, LNCS 2073, pp. 51-60, 2001 (also available at http://www.cs.utexas.edu/users/flame/pubs/ICCS2001,pdf).

Gunnels, et al. "A Novel Theoretical Model Produces Matrix Multiplication Algorithms That Predict Current Practice", IBM Research Report RC23443 (WO411-176), Nov. 19, 2004.

Fred G. Gustavson and Andre Henriksson and Isak Jonsson and Bo Kagstrom and Per Ling: Superscalar GEMM-based Level 3 BLAS The On-going Evolution of a Portable and High-Performance Library (1998); Applied Parallel Computing, Published 1998, Springer, pp. 207-215.

Volume 1, "Foundations of Computer-Aided Chemical Process Design" Copyright 1981, American Institute of Chemical Engineering (2-Volume Series), pp. 77-143.

Juan J. Navarro, Elena Garcia, nd Josep R. Herrero, Data Prefetching and Multilevel Blocking for Linear Algebra Operations in International Conference on Supercomputing (ICS '96), pp. 109-116, May 1996.

John A. Gunnels, Greg M. Henry, and Robert A. van de Geijn, A Family of High Performance Matrix Multiplication Algorithms, ICCS 2001, LNCS 2073, pp. 51-60, 2001 (Copyright Springer-Veriag Berlin Heidelberg 2001).

* cited by examiner

METHOD AND STRUCTURE FOR PRODUCING HIGH PERFORMANCE LINEAR ALGEBRA ROUTINES USING STREAMING

CROSS-REFERENCE TO RELATED APPLICATIONS

This application is a continuation application of U.S. patent application Ser. No. 10/671,934, filed on Sep. 29, 2003, now U.S. Pat. No. 7,475,101, issued on Jan. 6, 2009.

The following seven Applications, including the present Application, are related:

1. U.S. patent application Ser. No. 10/671,887, filed on Sep. 29, 2003, to Gustavson et al., entitled "METHOD AND STRUCTURE FOR PRODUCING HIGH PERFORMANCE LINEAR ALGEBRA ROUTINES USING COMPOSITE BLOCKING BASED ON L1 CACHE SIZE", now U.S. Pat. No. 7,487,195, issuing on Feb. 3, 2009;

2. U.S. patent application Ser. No. 10/671,933, filed on Sep. 29, 2003, to Gustavson et al., entitled "METHOD AND STRUCTURE FOR PRODUCING HIGH PERFORMANCE LINEAR ALGEBRA ROUTINES USING A HYBRID FULL-PACKED STORAGE FORMAT", now U.S. Pat. No. 7,386,582, issuing on Jun. 10, 2008;

3. U.S. patent application Ser. No. 10/671,888, filed on Sep. 29, 2003, to Gustavson et al., entitled "METHOD AND STRUCTURE FOR PRODUCING HIGH PERFORMANCE LINEAR ALGEBRA ROUTINES USING REGISTER BLOCK DATA FORMAT", now U.S. Pat. No. 7,469,266, issuing on Dec. 23, 2008;

4. U.S. patent application Ser. No. 10/671,889, filed on Sep. 29, 2003, to Gustavson et al., entitled "METHOD AND STRUCTURE FOR PRODUCING HIGH PERFORMANCE LINEAR ALGEBRA ROUTINES USING LEVEL 3 PREFETCHING FOR KERNEL ROUTINES", now abandoned;

5. U.S. patent application Ser. No. 10/671,937, filed on Sep. 29, 2003, to Gustavson et al., entitled "METHOD AND STRUCTURE FOR PRODUCING HIGH PERFORMANCE LINEAR ALGEBRA ROUTINES USING PRELOADING OF FLOATING POINT REGISTERS", now U.S. Pat. No. 7,571,435, issuing on Aug. 4, 2009;

6. U.S. patent application Ser. No. 10/671,935, filed on Sep. 29, 2003, to Gustavson et al., entitled "METHOD AND STRUCTURE FOR PRODUCING HIGH PERFORMANCE LINEAR ALGEBRA ROUTINES USING A SELECTABLE ONE OF SIX POSSIBLE LEVEL 3 L1 KERNEL ROUTINES", now U.S. Pat. No. 7,490,120, issuing on Feb. 10, 2009; and 7. U.S. patent application Ser. No. 10/671,934, filed on Sep. 29, 2003, to Gustavson et al., entitled "METHOD AND STRUCTURE FOR PRODUCING HIGH PERFORMANCE LINEAR ALGEBRA ROUTINES USING STREAMING", now U.S. Pat. No. 7,475,101, issuing on Jan. 6, 2009, all assigned to the present assignee, and all incorporated herein by reference.

BACKGROUND OF THE INVENTION

1. Field of the Invention

The present invention relates generally to a technique for improving performance for linear algebra routines, with special significance to optimizing the matrix multiplication process as exemplarily implemented in the existing LAPACK (Linear Algebra PACKage) standard. More specifically, a streaming technique allows a steady and timely flow of matrix data from different cache levels, in which submatrices of A, B, and C "play the role" of scalar, vector, and matrix in a general linear algebra subroutine kernel and are selectively stored in different cache levels.

2. Description of the Related Art

Scientific computing relies heavily on linear algebra. In fact, the whole field of engineering and scientific computing takes advantage of linear algebra for computations. Linear algebra routines are also used in games and graphics rendering.

Typically, these linear algebra routines reside in a math library of a computer system that utilizes one or more linear algebra routines as a part of its processing. Linear algebra is also heavily used in analytic methods that include applications such as supply chain management, as well as numeric data mining and economic methods and models.

A number of methods have been used to improve performance from new or existing computer architectures for linear algebra routines.

However, because linear algebra permeates so many calculations and applications, a need continues to exist to optimize performance of matrix processing.

SUMMARY OF THE INVENTION

In view of the foregoing and other exemplary problems, drawbacks, and disadvantages, it is, therefore, an exemplary feature of the present invention to provide various techniques that improve performance for linear algebra routines.

It is another exemplary feature of the present invention to improve factorization routines which are key procedures of linear algebra matrix processing.

It is another exemplary feature of the present invention to provide more efficient techniques to access data in linear algebra routines.

It is another exemplary feature of the present invention to provide a method of streaming data for matrix multiplication routines in which matrices are placed into caches based on a size of the matrices.

To achieve the above and other exemplary purposes, in a first exemplary aspect of the present invention, described herein is a method (and structure) for executing a linear algebra subroutine on a computer having a cache (e.g., an L1 cache), including streaming data for matrices involved in processing the linear algebra subroutine such that data is processed using data for a first matrix stored in the L1 cache as a matrix format and data from a second matrix and a third matrix is stored in a memory device at a higher level than the L1 cache, the streaming providing data from the higher level as the streaming data is required for the processing.

In a second exemplary aspect of the present invention, also described herein is a signal-bearing medium tangibly embodying a program of machine-readable instructions executable by a digital processing apparatus to perform the above-described method.

In a third exemplary aspect of the present invention, also described herein is a method of at least one of solving and applying a scientific/engineering problem, including at least one of: using a linear algebra software package that performs one or more matrix processing operations, the method comprising streaming data for matrices involved in processing the linear algebra subroutines such that data is processed using data for a first matrix stored in a cache (e.g., an L1 cache) as a matrix format and data from a second matrix and a third matrix is stored in a memory device at a higher level than the L1 cache, the streaming providing data from the higher level in a manner as the streaming data is required for the processing; providing a consultation for purpose of solving a scientific/engineering problem using the linear algebra software package; transmitting a result of the linear algebra software package on at least one of a network, a signal-bearing medium containing machine-readable data representing the result, and a printed version representing the result; and receiving a result of the linear algebra software package on at least one of a network, a signal-bearing medium containing machine-readable data representing the result, and a printed version representing the result.

The present invention provides a technique for efficiently bringing data for matrix processing through multiple levels of a computer memory system. By using a generalized streaming technique, data for one matrix in a Level 3 linear algebra subroutine will reside in a first level of cache, and data for the two remaining matrices will be streamed into the L1 cache as required by the subroutine directing the processing.

BRIEF DESCRIPTION OF THE DRAWINGS

The foregoing and other exemplary purposes, aspects and advantages will be better understood from the following detailed description of exemplary embodiments of the invention with reference to the drawings, in which.

DETAILED DESCRIPTION OF PREFERRED
EMBODIMENTS OF THE INVENTION

Figure 1:
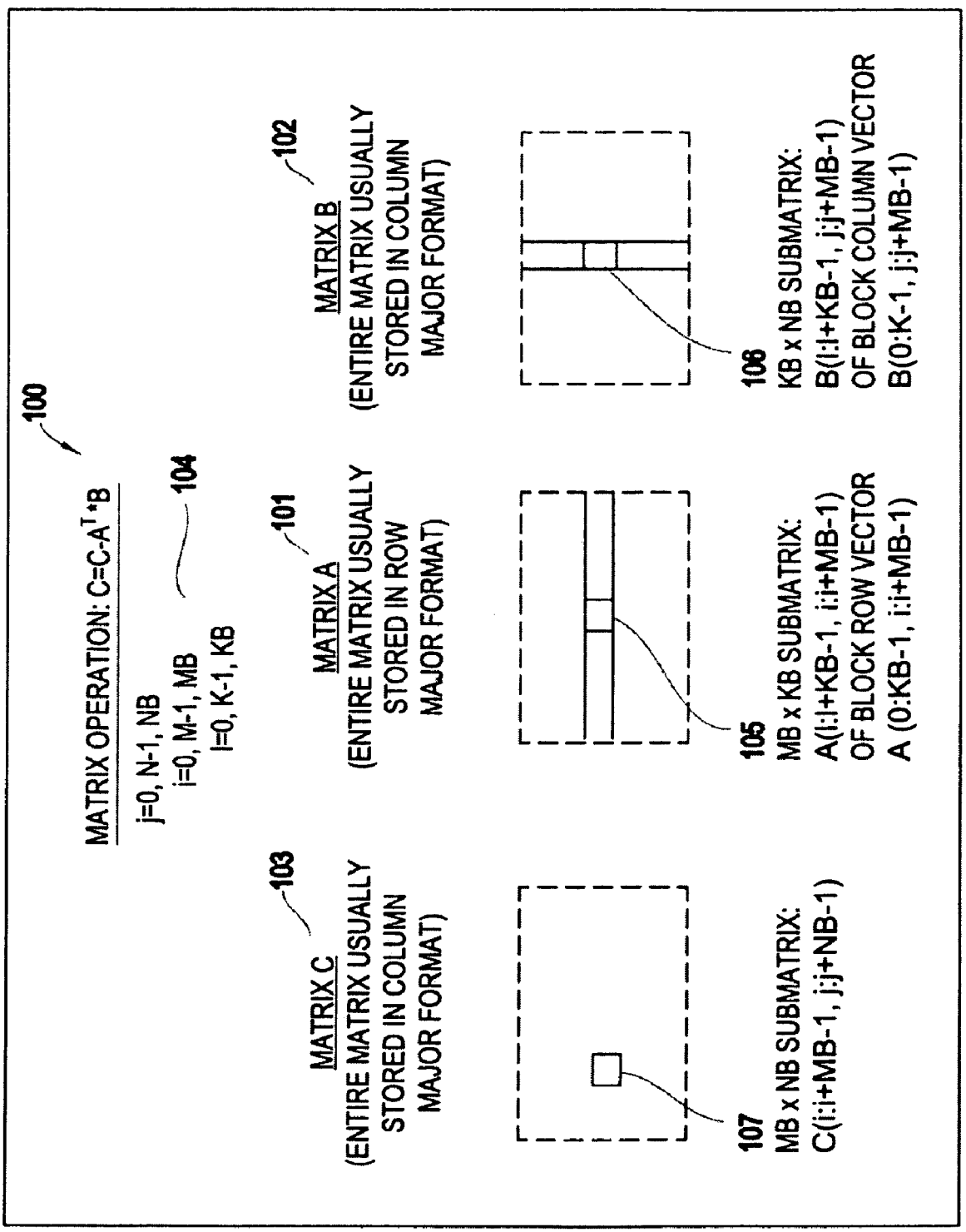
FIG. 1 illustrates a matrix representation 100 for an operation exemplarily discussed herein.

Referring now to the drawings, and more particularly to FIG. 1, a preferred embodiment of the present invention will now be discussed. The present invention addresses efficiency in the calculations of linear algebra routines, as shown exemplarily in FIG. 1, in which is illustrated a processing of the matrix operation $C=C-A^T*B$. For purpose of discussion only, Level 3 BLAS (Basic Linear Algebra Subprograms) of the LAPACK (Linear Algebra PACKage) are used, but it is intended to be understood that the concepts discussed herein are easily extended to other linear algebra mathematical operations and math library modules.

FIG. 1 illustrates processing of an exemplary matrix operation 100 (e.g., $C=C-A^T*B$). In processing this operation, matrix A is first transposed to form transpose-matrix-A (e.g., $A^T$) 101. Next, transposed matrix $A^T$ is multiplied with matrix B 102 and then subtracted from matrix C 103. The computer program executing this matrix operation will achieve this operation using three loops 104 in which the element indices of the three matrices A, B, C will be varied in accordance with the desired operation.

That is, as shown in the lower section of FIG. 1, the inner loop and one step of the middle loop will cause indices to vary so that MB rows 105 of matrix $A^T$ will multiply with NB columns 106 of matrix B. The index of the outer loop will cause the result of the register block row/column multiplications to then be subtracted from the MB-by-NB submatrix 107 of C to form the new submatrix 107 of C. FIG. 1 shows an exemplary "snapshot" during execution of one step of the middle loop i=i:i+MB−1 and all steps of the inner loop 1, with the outer loop j=j:j+NB−1.

A key idea of the generalized streaming discussed herein is the generalization of Example 1 shown in FIG. 1 for higher levels of the memory hierarchy. In Example 1, there is a cache resident matrix $A^T$ of size K1×M1, a vector block B of size K1×N0, and a scalar block C of size M0×N0. At a given instant of time, the sizes of the vector block and scalar block is of order 0 and the size of the A is of order 1 (see bottom of FIG. 5).

All of a piece of C and part of a piece of B has size of order 2, and these pieces of C and B reside in the next higher level of the memory hierarchy, namely L2 cache. In L2 cache we have cache resident matrix C of size M2×N2 and, at a given instant in time, streaming pieces (vector block B of size K1×N2) and scalar block A of size M1×K1 (e.g., see top of FIG. 5).

Before stopping here, we mention briefly TLB (Translation Lookaside Buffer). The TLB is a term well understood in the art as referring to accessing data residing in the memory spanned by the current TLB pages. Usually, the size of the TLB is a sizable fraction of the size of the L2 cache.

Thus, in the above paragraph, the size of N2 is chosen so that the cache resident piece and the two streaming pieces can "fit" into the TLB. By doing so, TLB thrashing can be avoided.

Returning, the generalization should be clear. In level 3 cache, we have cache resident matrix piece of A of size M3×K3 and, at a given instance of time, a vector block piece of B of size K3×N2 and a scalar block piece of C of size M2×N2 (e.g., see FIG. 6, and note that is exactly like the bottom of FIG. 5).

However, before presenting the exemplary details of the present invention, the following general discussion provides a background of linear algebra subroutines and computer architecture as related to the terminology used herein.

Linear Algebra Subroutines

The explanation of the present invention includes reference to the computing standard called LAPACK (Linear Algebra PACKage) and to various subroutines contained therein. LAPACK is well known in the art and information on LAPACK is readily available on the Internet. When LAPACK is executed, the Basic Linear Algebra Subprograms (BLAS), unique for each computer architecture and provided by the computer vendor, are invoked. LAPACK comprises a number of factorization algorithms for linear algebra processing.

For example, Dense Linear Algebra Factorization Algorithms (DLAFAs) include matrix multiply subroutine calls, such as Double-precision Generalized Matrix Multiply (DGEMM). At the core of level 3 Basic Linear Algebra Subprograms (BLAS) are "L1 kernel" routines which are constructed to operate at near the peak rate of the machine when all data operands are streamed through or reside in the L1 cache.

The most heavily used type of level 3 L1 DGEMM kernel is Double-precision A Transpose multiplied by B (DATB), that is, $C=C-A^T*B$, where A, B, and C are generic matrices or submatrices, and the symbology $A^T$ means the transpose of matrix A (see FIG. 1). It is noted that DATB is commonly the only such kernel employed by today's state of the art codes, although DATB is only one of six possible kernels.

The DATB kernel operates so as to keep the A operand matrix or submatrix resident in the L1 cache. Since A is transposed in this kernel, its dimensions are K1 by M1, where K1×M1 is roughly equal to the size of the L1. Matrix A can be viewed as being stored by row, since in Fortran, a non-transposed matrix is stored in column-major order and a transposed matrix is equivalent to a matrix stored in row-major order. Because of asymmetry (C is both read and written) K1 is usually made to be greater than M1, as this choice leads to superior performance.

Exemplary Computer Architecture

Figure 2:
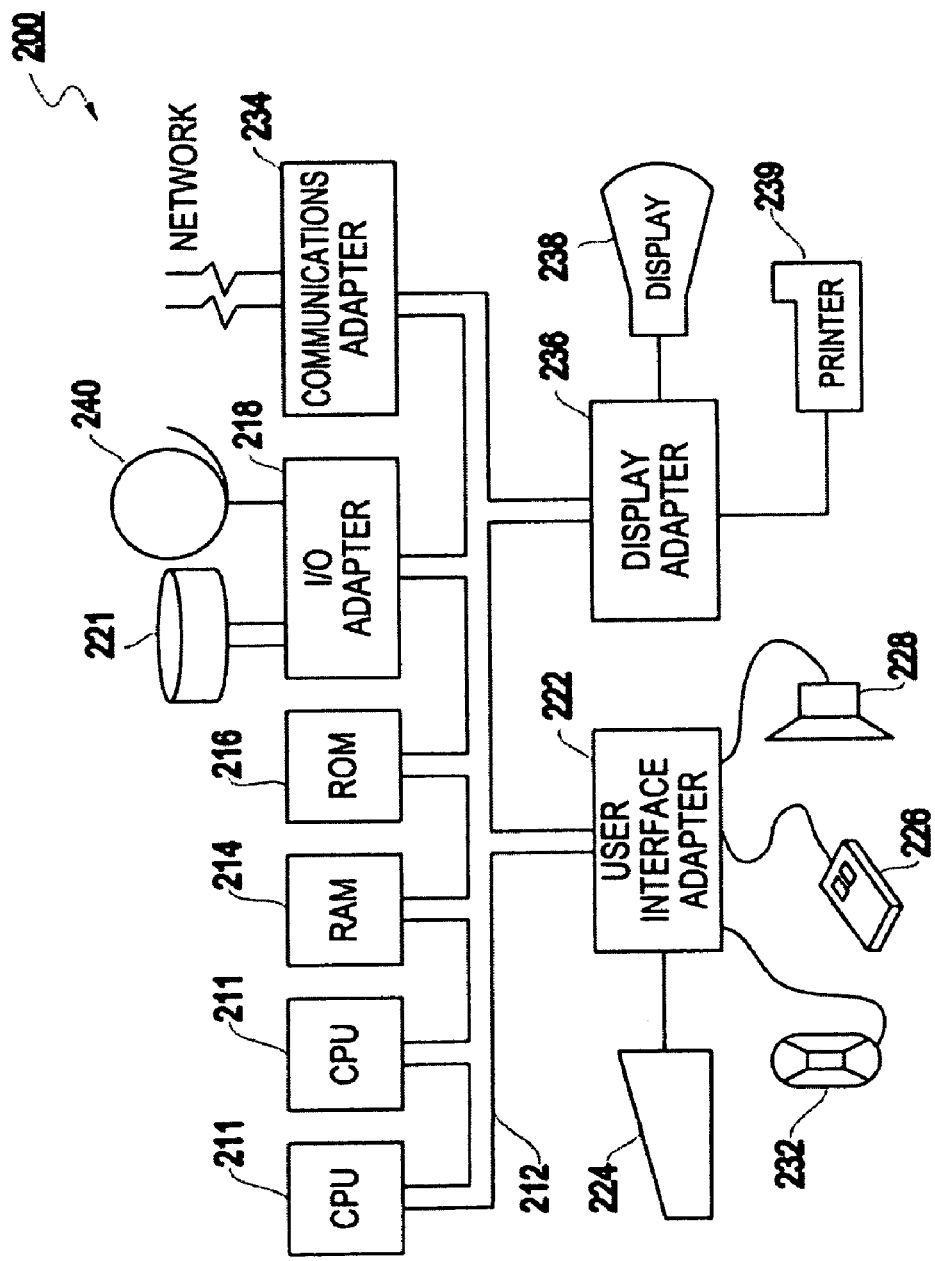
FIG. 2 illustrates an exemplary hardware/information handling system 200 for incorporating the present invention therein.

FIG. 2 shows a typical hardware configuration of an information handling/computer system 200 usable with the present invention. Computer system 200 preferably has at least one processor or central processing unit (CPU) 211. Any number of variations are possible for computer system 200, including various parallel processing architectures and architectures that incorporate one or more FPUs (floating-point units).

In the exemplary architecture of FIG. 2, the CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, microphone 232, and/or other user interface device to the bus 212), a communication adapter 234 for connecting an information handling system to a data processing network, the Internet, an Intranet, a personal area network (PAN), etc., and a display adapter 236 for connecting the bus 212 to a display device 238 and/or printer 239 (e.g., a digital printer or the like).

Although not specifically shown in FIG. 2, the CPU of the exemplary computer system could typically also include one or more floating-point units (FPU's) that performs floating-point calculations. Computers equipped with an FPU perform certain types of applications much faster than computers that lack one. For example, graphics applications are much faster with an FPU. An FPU might be a part of a CPU or might be located on a separate chip. Typical operations are floating point arithmetic, such as fused multiply/add (FMA), addition, subtraction, multiplication, division, square roots, etc.

Figure 3:
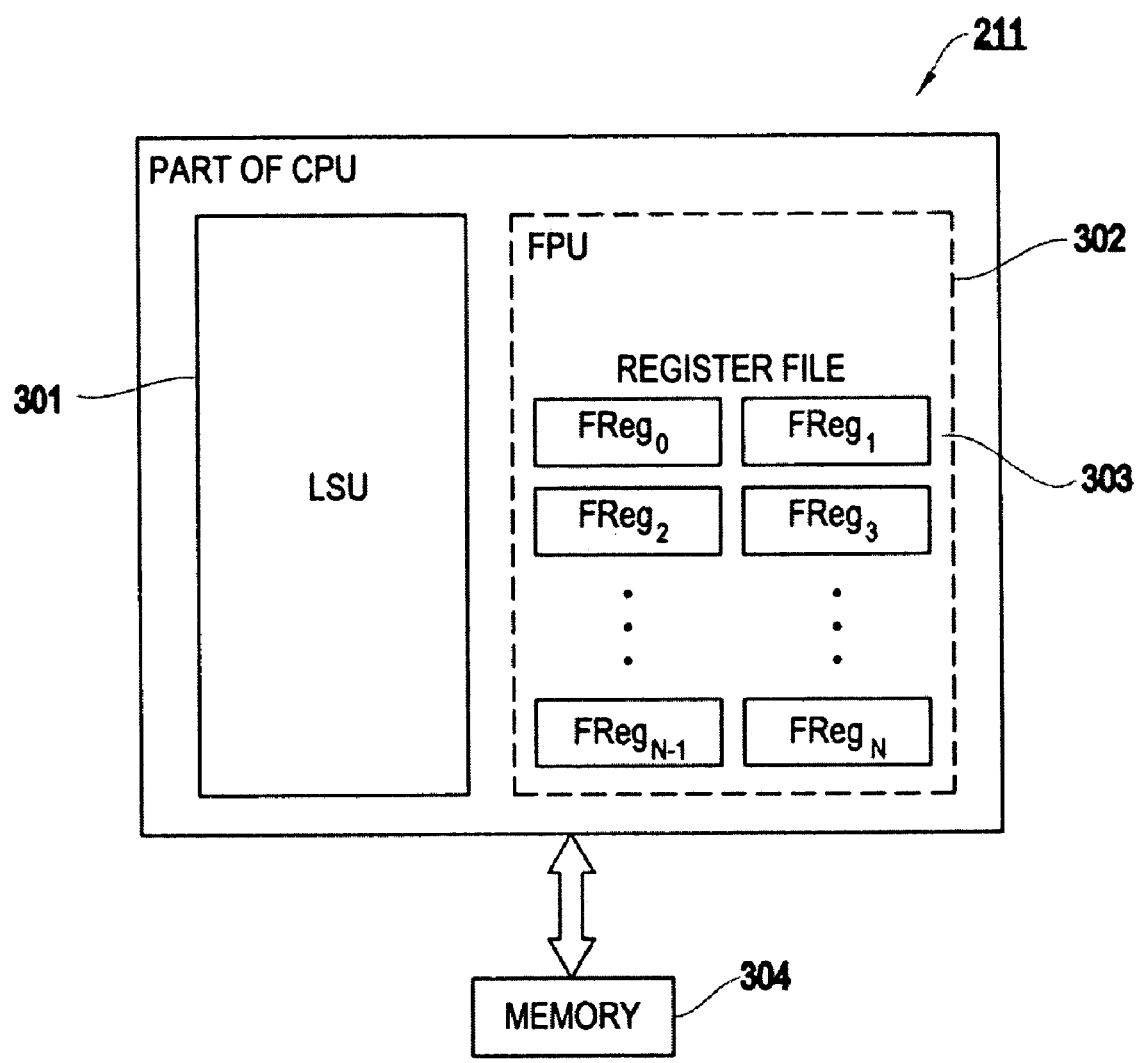
FIG. 3 illustrates an exemplary CPU/Floating Point Unit (FPU) architecture 302 which can be incorporated into the present invention.

Details of the FPU are not so important for an understanding of the present invention, since a number of configurations are well known in the art. FIG. 3 shows an exemplary typical CPU 211 that includes at least one FPU 301. The FPU function of CPU 211 includes controlling the FMAs (floating-point multiply/add) and at least one load/store unit (LSU) 301 to service a number of floating point registers (FRegs) 303.

It is noted that in the context of the present invention involving linear algebra processing, the term "FMA" can also be translated as "fused multiply-add" operation/unit, and the present discussion does not care which of the translations is used. The role of the LSU 301 is to move data from a memory device 304 to the registers 303 used by the FMA and to subsequently transfer the results back into a memory device 304.

Figure 4:
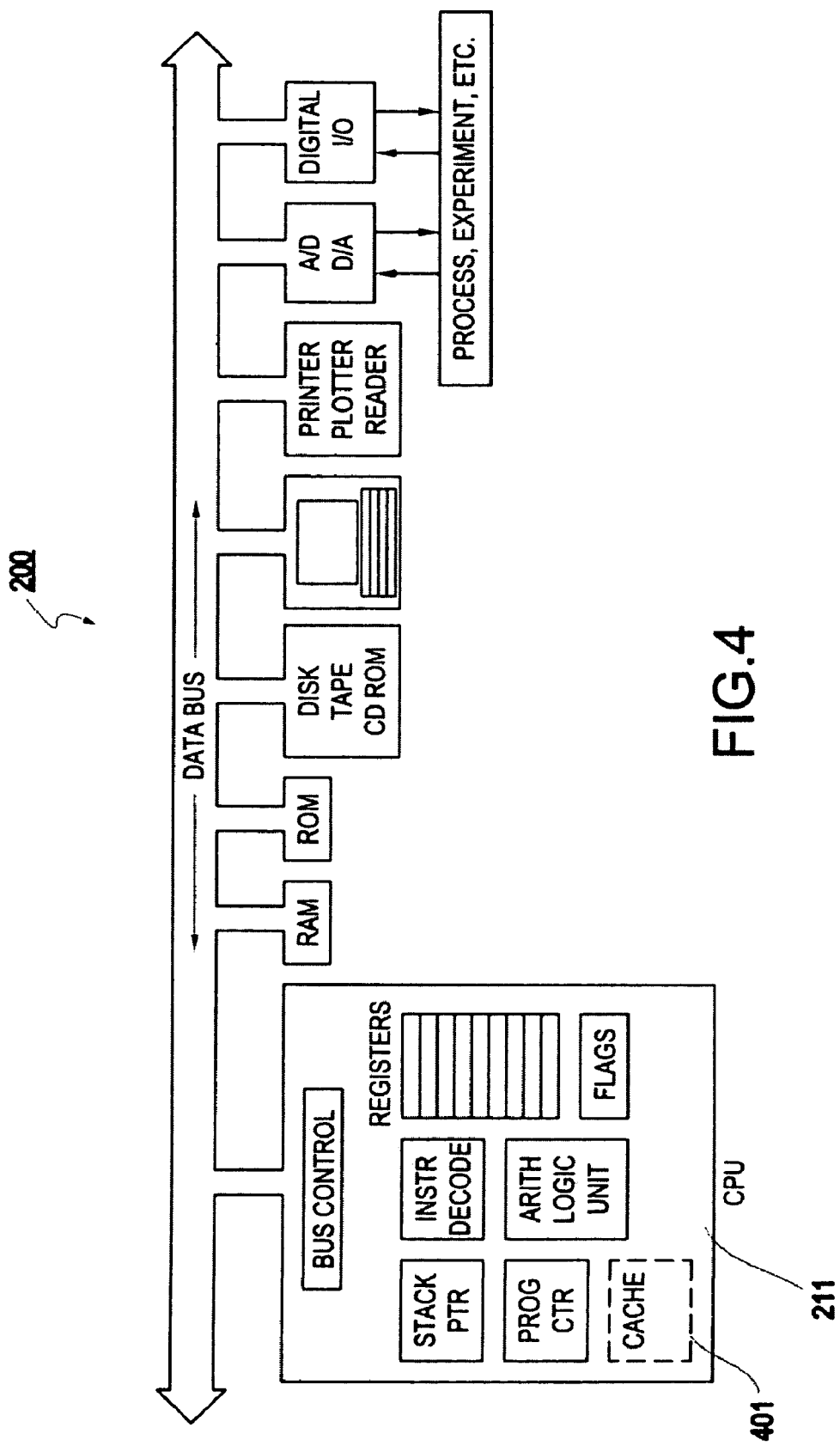
FIG. 4 exemplarily illustrates in more detail the CPU 211 which can be used in a computer system 200 for the present invention.

Another important exemplary aspect of the present invention relates to computer architecture that incorporates a memory hierarchy involving one or more cache memories. FIG. 4 shows in more detail how the simple computer system 200 might incorporate a cache 401 in the CPU 211.

Discussion of the present invention includes reference to levels of cache, and more specifically, level 1 cache (L1 cache), level 2 cache (L2 cache) and even level 3 cache (L3 cache). Level 1 cache is typically considered as being a cache that is closest to the CPU, and might even be included as a component of the CPU, as shown in FIG. 4. A level 2 (and higher-level) cache is typically considered as being cache outside the CPU.

The details of the cache structure and the precise location of the cache levels are not so important to the present invention so much as recognizing that memory is hierarchical in nature in modern computer architectures and that matrix computation can be enhanced considerably by modifying the processing of matrix subroutines to include considerations of the memory hierarchy.

Additionally, in the present invention, it is preferable that the matrix data be laid out contiguously in memory in "stride one" form. "Stride one" means that the data is preferably contiguously arranged in memory to honor double-word boundaries and the useable data is retrieved in increments of the line size.

The importance of having six kernel types available is that stride one memory access is desirable for matrix processing. The matrices A and B are usually stored either by row or by column. By having six kernel types, one can choose a kernel in which stride one is available for both operands. Having only one kernel type, instead of six kernel types, means that data copy must be done to provide the format of the one conventional kernel. This means a certain performance loss that might have to be repeated several times.

Streaming Level 3 L1 Kernel Routines for General Matrix Multiplication

All modern programming languages (C, Fortran, etc.) store matrices as two-dimensional arrays for a matrix A. That is, let matrix A have M rows and N columns. The standard column major format of A is as follows.

Each of the N columns of A are stored as a contiguous vector (stride one). Each of the M rows of A are stored with consecutive elements separated by LDA (Leading Dimension of A) storage locations (stride LDA). Let A(0,0) be stored in memory location ''. The matrix element A(i,j) is stored in memory location ''+i+LDA*j. It is important to note here that stride one is optimal for memory accesses and that stride LDA is poor. Also, almost all level 3 linear algebra code treats rows and columns about equally.

Modern architectures support this programming language construct. Further, existing codes support this data structure. Thus, the majority of programming architectures support, in their machine (engineering) implementations, machine (optimized) instructions that can be used to easily address and, hence, quickly access elements of one- and two-dimensional arrays that are stored in traditional formats. At the register level, the register blocks are submatrices stored in a fashion to optimally exploit the FPU enhanced hardware.

The underlying program construct that supports one- and two-dimensional arrays is the FOR or DO loop. This is an example of generalized counting via arithmetic progression:

DO i=istart, iend, istep

. . .

ENDDO.

When a contiguous array that fits in a cache (e.g., the L1 cache) is accessed using this programming construct, near-peak performance can be obtained (provided there is a good L1 cache-FPU register interface) because the architectures are optimized to be as efficient as possible.

Traditional IJL (FOR) loop implementations of level 3 L1 DGEMM are likely to be optimal when the underlying arrays are contiguous and map well into the L1 cache. Thus, there is at most six (3!=3×2) level 3 L1 DGEMM kernels to consider. Despite conventional practice, which employs only one, all six are viable under appropriate circumstances. Stride-one data access is the most efficient form of accessing data. Application of the fact is less important when the entire two-dimensional arrays reside in L1 cache as, often, for data in the L1 cache, access time behaves in a manner consistent with (uniform) RAM (Random Access Memory).

Thus, in the context of the present invention, "streaming" occurs when parts of matrices fit in the L2 cache, rather than the L1 cache, and will be accessed systematically as explained below. In other words, typically only one of the matrices, or a submatrix thereof, is L1 cache-resident.

A pattern of all six kernel types is to have an L1 cache resident matrix operand, while the remaining two matrix operands (called "streaming matrices") reside in the next higher memory level (e.g., L2 in this case), if necessary. The outer loop variable defines the common order of streaming. The size of the common dimension of the two streaming matrices is determined by the size of L2.

That is, if N is assumed to be the streaming dimension, the two streaming matrices are C and B, whose dimensions are M by N and K by N. Storage for C and B is MN and KN, respectively. If cache L2 has size L2S, then, assuming that C is the cache resident matrix of L2, MN<L2S or N<L2S/M.

The discussion in the sixth of the above-identified co-pending Applications provided a brief discussion on streaming for the six kernel types. At level L1, there is a cache resident matrix and two matrices streaming from level L2 (see also FIG. 1).

This discussion herein continues the discussion of streaming by describing the concept of generalized streaming and, more specifically, how to choose the cache resident matrix at level L2 (more generally, at level i+1) from the remaining two choices after the matrix has been selected for L1 (more generally, level i).

As an example, the IJL forms of DGEMM leading to DAXPY (scaled vector addition) and DDOT (dot-product) forms are now presented. For example, the equation C=C−A*B can be considered with either:

DDOT CE C=C−A^T*B (e.g., transpose A and use DATB)
DAXPY BE C=C−A*B (e.g., copy A and use DAB kernel)

Any IJL form leads to a cache residency pattern of matrices A, B, and C of type matrix, vector, and scalar (e.g., more specifically, patterns where submatrices of A, B, and C "play the role" of scalar, vector, and matrix in the kernel type).

Thus, to be more specific, in the context of the present invention, one is using streaming where the vector and scalar parts of matrices fit in the L2 (not L1) cache. In other words, only the submatrix playing the role of the matrix is L1 cache-resident.

To illustrate the technique of streaming, one of the DDOT kernels is used. However, the same holds true for the other DDOT kernel and all 4 DAXPY kernels. A simplified DATB kernel (JIL order) (see also FIG. 1), including 4-by-4-by-1 register blocking, follows:

```
do j = 0, N−4, 4
  do i = 0, M−4, 4
    Tij = C(i:i+3,j:j+3)           ! 16 loads of C
    do l = 0, K−1
      Ai = A(l,i:i+3)               ! 4 loads of A^T
      Bj = A(l,j:j+3)               ! 4 loads of B
      Tij = Tij + Ai * Bj           ! 16 FMAs
    enddo
    C(i:i+3,j:j+3) = Tij            ! 16 stores of C
  enddo
enddo
```

In the DATB kernel illustrated above, consider the outer do loop on j as removed and then consider one iteration (i=i−>i+3) of the middle loop. The matrix data necessary for this iteration is A(0:K−1,i:i+3), B(0:K−1, j:j+3), and C(i:i+3,j:j+3). During this execution time interval, 16 elements of C are needed, as are four vectors, B(0:K−1,j:j+3). (see also FIG. 1.)

Now, consider the entire middle loop with J fixed at j:j+3. During this larger execution time interval, all of A(0:K−1,0:M−1) matrix, a 4 vector of B(0:K−1,j:j+3), and scalar pieces (C(i:i+3,j:j+3), read in and written out) of C(0:M−1,j:j+3) are required.

Thus, during one iteration of the outer loop, cache residency includes a scalar piece or pieces of C, a vector piece of B, and the entire contiguous matrix A. It follows that the entire execution of DATB (over the outer loop) includes streaming vectors of B and scalars of C from L2 into and out of L1, during which the entire matrix A remains cache resident.

It is noted that tiny pieces of B and C that reside in L1 during one iteration of the outer loop are reused M and K times, respectively. Thus, their initial loading penalty from L2 is amortized by those selfsame factors.

The remaining five loop permutations: IJL, ILJ, LIJ, JLI, and LJI each give rise to matrix, vector, and scalar patterns of input matrices BAC, BCA, CBA, ACB, and CAB, respectively. The last four patterns are DAXPY kernel types while the first pattern is the second DDOT kernel type.

As mentioned above, the pattern of all six kernel types is to have an L1 cache resident matrix operand while the remaining two matrix operands (called "streaming matrices") reside, either entirely or in pieces, in the next higher memory level (e.g., L2 in this case). The outer loop variable, N for the DDOT kernel above, defines the common order of streaming. The size of the common dimension of the two streaming matrices (e.g., B and C has common dimension N in the DDOT example above) is determined by the size of L2 (e.g., N<L2S/M if C is the resident matrix of L2).

It follows that, with data copy, which is a one-time cost, these IJL ideas generalize to all l=1, ..., M caches, plus main memory (i.e., a total of M+1 levels). For purpose of the present invention, this more general concept of streaming is referred to as "generalized streaming", as further discussed below.

Generalized Streaming/Optimal Multi-Level Blocking

In the discussion above, streaming is described for six types of kernels. At level i, i=1 in the first embodiment, there is a cache-resident matrix and two streaming matrices from level i+1. The following discussion describes how to choose the cache resident matrix at level i+1 from the two possible choices for i>1.

First, matrices A, B, and C have orders M by K, K by N, and M by N for C =C+A*B. There are six possible arrangements of the ordering M, N, and K, assuming M ! N, K ! N, M ! K:

| | | |
|---|---|---|
| M > N > K | N > M > K | K > M > N |
| M > K > N | N > K > M | K > N > M |

Streaming occurs optimally only if the common dimension can be large. The reason for this is conservation of the matrix data. Hence for level one, the largest order is chosen as the streaming dimension, for example, a=N2 (in general, a=M or N or K). Here, the suffix "2" on N indicates that the cache resident matrix (i.e. the matrix that remains in that level of the cache) should occupy most of the L2 cache. It is noted that, if a (N in this case) is small enough, then up to L2 level blocking will suffice.

Moving now to level 2, when a is sufficiently large, there are two streaming matrices with common dimension a. The remaining orders are b and d for the dimensions of the two other streaming matrix dimensions. From the two remaining matrices, the one which is chosen has other dimension c=max (b, d).

Hence, streaming at level 2 will be C, the second largest order (from M/N/K). This defines a "generalized" kernel at level 2 (one of the six choices) described above. The L2 cache resident matrix has size a (N2) by g (M2) with streaming dimension c (K3).

In this example, g=M2 is the remaining order from M, N, and K. In L1 the cache resident matrix has order g (M1) by c (K1) with streaming dimension a (N2). The size of L3 determines how much streaming can be allocated to the L2 streaming dimension c (K in this case) whenever c is sufficiently large. Of course, if c is small enough then blocking up to L3 will prove sufficient.

For illustration, it is assumed that N>K>M. The L1 kernel will be JIL (L is the index for the K dimension). See also the example in FIG. 1. The cache resident matrix, A, will have size $m_1$ by $k_1$ (and it is stored in transposed format to facilitate stride one access) and streaming matrix pieces of size $m_1$ by $n_0$ (C) and $k_1$ by $n_0$ (B) will enter from L2. Note that $m_1$ by $n_0$ (C) enters in smaller pieces m0 by n0. The L2 cache resident matrix will be $m_2$ by $n_2$ C along with streaming matrix pieces of size $m_2$ by $k_1$ A (scalar) and $k_1$ by $n_2$ B (vector). Again, note that m2 by k1 (A) is made up of scalar pieces of size m1 by k1. The inner loop of the generalized kernel will be a call to the kernel routine, JIL which has loop variables $j_1, i_1, l_1$.

Hence, denoting loop variables $l_2, i_2, j_2$ for the generalized L2 kernel, it can be seen that the $j_2$ loop of the generalized L2 kernel collapses with the $j_1$ loop variable of the L1 kernel JIL under this new type of L2-L1 blocking for matrix multiply. We have loop variables $l_2, i_2, j_1, i_1, l_1$ or $l_2, i_2$ (L1 kernel routine call).

Figure 5:
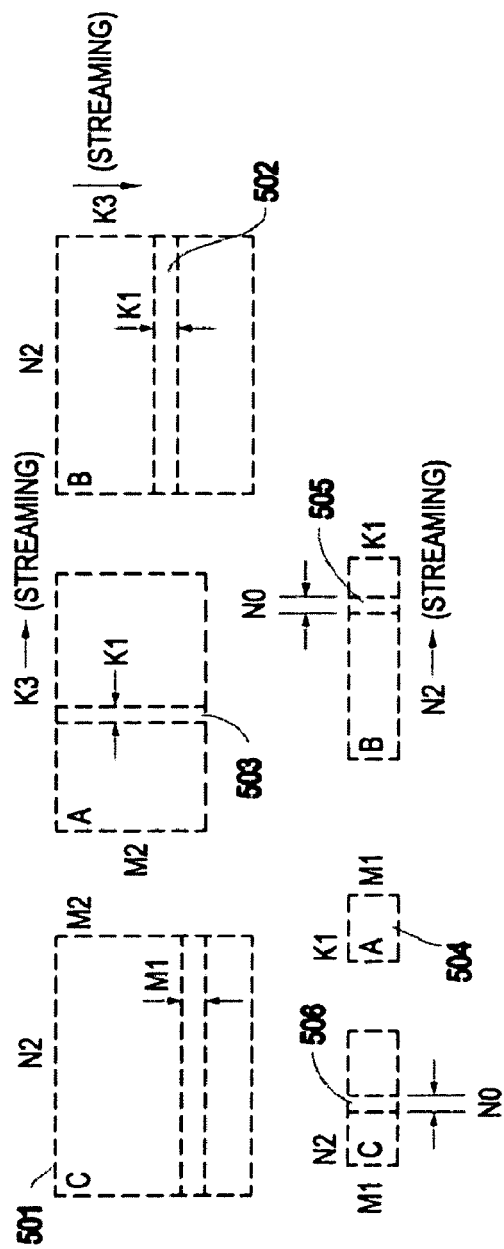
FIG. 5 exemplarily illustrates a picture 500 of the matrix layout for L2 and L1 for an example discussed herein.
Figure 6:
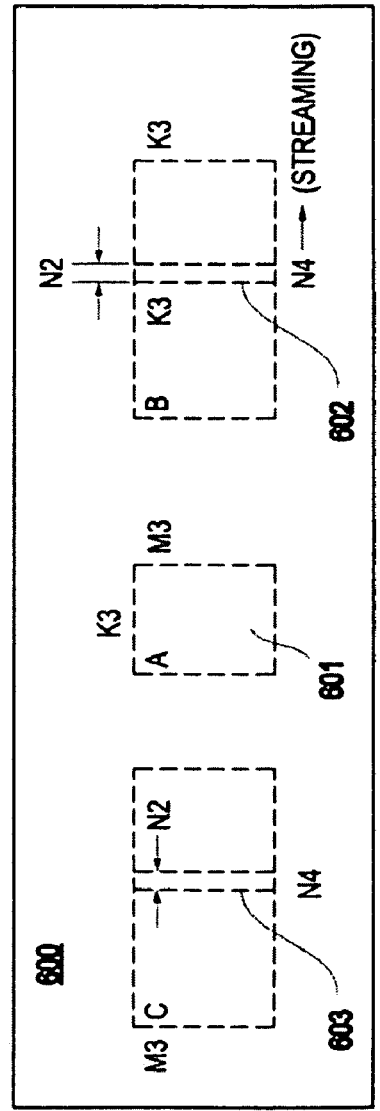
FIG. 6 exemplarily illustrates a larger picture 600 for L3 and L2 for the same example discussed herein.

In FIG. 5, an exemplary picture 500 is given of the matrix layout for L2 and L1, and the pseudocode listing below gives the matrix multiply routine that would correspond to the layout depicted in FIG. 5. It is noted again that the numerical suffix is associated with a cache level (e.g., K1, M2). The outermost $l_2$ loop of the pseudocode below indicates that M2×N2 C 501, K1×N2 B 502, and M2×K1 A 503 will occupy L2 and that during this execution time interval Ceil[K/K1] *Ceil[M/M1]*Ceil[N/N2] calls will be made to kernel DATB, where for each call, L1 cache residency will be M1×K1 A 504, K1×N0 B 505, and M1×N0 C 506. (M1×N0 C is made up of scalar M0×N0 pieces of C.)

Pseudocode for FIG. 5

```
DO l2 = 0, K−1, k1
  lb2 = min(K−l2,k1)
  DO i2 = 0, M−1, m1
    ib2 = min(M−i2, m1)
    DO j1 = 0, N−1, n2
      jb1 = min(N−j1,n2)
      call datb(ib2,jb1,lb2 ,A(l2,i2),lda,B(l2,j1),ldb,C(i2,j1),ldc)
    ENDDO
  ENDDO
ENDDO
```

This L2-L1 description generalizes to an L+1 level (L caches and main memory) memory hierarchy. In the above example, the L3 picture would be a (larger) replica 600 of the L1 picture, as shown exemplarily in FIG. 6. This should also be compared with FIG. 1 for the smaller picture. L3 residency is made up of M3×K3 matrix A 601, K3×N2 vector B 602, and "M3×N2" scalar C 603.

It is noted that M1, N0, K1 get replaced by M3, N2, and K3, respectively, as this JIL kernel in L3 is a replica of the same JIL kernel in L1, two levels below L3. Likewise, the L4 picture would be a replica of the L2 picture where M2, N2, and K3 are replaced by M4, N4, and K5, respectively. Here, the replica "drop" is from L4 to L2.

So, in an L+1 level memory hierarchy, we would have two generalized kernel routines that flip flop result. The multi-level blocking routine would have two loop variables that block the cache-resident matrix at level l (l=1, . . . , L+1). Each kernel has three loop variables. However, due to the nature of streaming, loop collapsing is obtained between every level-pair.

In the current example, N>K>M, JIL is obtained at levels 1, 3, 5, . . . and LIJ at levels 2, 4, 6, . . . . Between levels 2i and 2i−1, one of the two J loop variables disappears. Between levels 2i+1 and 2i, one of the two L loop variables disappears.

Previous work reduced the poly-algorithmic count from $6^m$ to $2^m$, where m=M+1 is the number of memory hierarchy levels. Furthermore, previous work emphasized only one of six kernels but stating that a second DDOT kernel type was possible. Here, it has been shown that this complexity can be reduced to six, irrespective of the number of levels in the memory hierarchy. Also, at the L1 level, this invention admits (see also the sixth above-listed copending application) that six kernel types are possible or desirable instead of just one or two kernel types. Simply select algorithms X and Y (as optimal for the lowest two levels of the hierarchy, based on the input matrix sizes). Then switch back and forth (flip-flop) between algorithms X and Y as the memory hierarchy is traversed upward.

It should be apparent that, in general, in an exemplary preferred embodiment, the computer will have a plurality i of caches, i=1, . . . , M+1. Data for matrices involved in processing a linear algebra subroutine will be streamed such that data for a first matrix will be resident in level i cache, either in its entirety or as a submatrix, and data from a second matrix and third matrix will be stored in the higher level i+1 cache, also either in the entirety or as submatrices, and the streaming will provide data as required for the processing.

It should also be apparent that the concepts described herein can readily be combined with one or more of the concepts taught in the remaining co-pending Applications to achieve even more efficiency than when incorporated as an isolated technique.

Software Product Embodiments

In addition to the hardware/software environment described above, a different exemplary aspect of the invention includes a computer-implemented method for performing the invention.

Such a method may be implemented, for example, by operating a computer, as embodied by a digital data processing apparatus, to execute a sequence of machine-readable instructions. These instructions may reside in various types of signal-bearing media.

Thus, this exemplary aspect of the present invention is directed to a programmed product, comprising signal-bearing media tangibly embodying a program of machine-readable instructions executable by a digital data processor incorporating the CPU 211 and hardware above, to perform the method of the invention.

Figure 7:
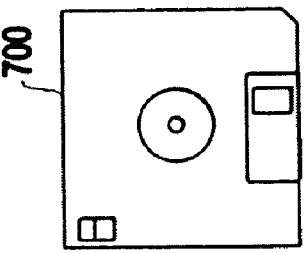
FIG. 7 illustrates a signal bearing medium 700 (e.g., storage medium) for storing steps of a program of a method according to the present invention.

This signal-bearing media may include, for example, a RAM contained within the CPU 211, as represented by the fast-access storage for example. Alternatively, the instructions may be contained in another signal-bearing media, such as a magnetic data storage diskette 700 (FIG. 7), directly or indirectly accessible by the CPU 211.

Whether contained in the diskette 700, the computer/CPU 211, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless.

The second exemplary aspect of the present invention can be embodied in a number of variations, as will be obvious once the present invention is understood. That is, the methods of the present invention could be embodied as a computerized tool stored on diskette 700 that contains a series of matrix subroutines to solve scientific and engineering problems using matrix processing.

Alternatively, diskette 700 could contain a series of subroutines that allow an existing tool stored elsewhere (e.g., on a CD-ROM) to be modified to incorporate one or more of the features of the present invention which will be described shortly. It should also be obvious to one of skill in the art that the matrix subroutines described or referred to herein can be downloaded through a network interface from a remote storage facility.

The second exemplary aspect of the present invention additionally raises the issue of general implementation of the present invention in a variety of ways.

For example, it should be apparent, after having read the discussion above that the present invention could be implemented by custom designing a computer in accordance with the principles of the present invention. For example, an operating system could be implemented in which linear algebra processing is executed using the principles of the present invention.

In a variation, the present invention could be implemented by modifying standard matrix processing modules, such as described by LAPACK, so as to be based on the principles of the present invention. Along these lines, each manufacturer could customize their BLAS subroutines in accordance with these principles.

It should also be recognized that other variations are possible, such as versions in which a higher level software module interfaces with existing linear algebra processing modules, such as a BLAS or other LAPACK module, to incorporate the principles of the present invention.

Moreover, the principles and methods of the present invention could be embodied as a computerized tool stored on a memory device, such as independent diskette 700, that contains a series of matrix subroutines to solve scientific and engineering problems using matrix processing, as modified by the technique described above. The modified matrix subroutines could be stored in memory as part of a math library, as is well known in the art. Alternatively, the computerized tool might contain a higher level software module to interact with existing linear algebra processing modules.

It should also be obvious to one of skill in the art, after having read the present specification, that the instructions for the technique described herein can be downloaded through a network interface from a remote storage facility.

All of these various embodiments are intended as included in the present invention, since the present invention should be appropriately viewed as a method to enhance the computation of matrix subroutines, as based upon recognizing how linear algebra processing can be more efficient by using the principles of the present invention.

In yet another exemplary aspect of the present invention, it should also be apparent to one of skill in the art, after having read the present specification, that the principles of the present invention can be used in yet another environment in which parties indirectly take advantage of the present invention.

For example, it is understood that an end user desiring a solution of a scientific or engineering problem may undertake to directly use a computerized linear algebra processing method that incorporates the method of the present invention. Alternatively, the end user might desire that a second party provide the end user the desired solution to the problem by providing the results of a computerized linear algebra processing method that incorporates the method of the present invention. These results might be provided to the end user by a network transmission or even a hard copy printout of the results.

The present invention is intended to cover all these various methods of using the present invention, including the end user who uses the present invention indirectly by receiving the results of matrix processing done in accordance with the principles of the present invention.

The present invention provides a generalized technique that improves performance for linear algebra routines. The method and structure discussed here, yields higher-performance linear algebra routine processing for traditionally-slow subroutines that process matrices by providing a generalized data streaming technique that permits matrix data to efficiently be available for the matrix processing operation.

All of the various embodiments discussed above are intended as included in the present invention, since the present invention should be appropriately viewed as methods to provide efficiency in the computation of conventional matrix subroutines by streaming data efficiently from higher levels of cache during execution of linear algebra subroutines.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method of improving at least one of speed and efficiency when executing a linear algebra subroutine on a computer having a memory hierarchical structure including at least one cache, said method comprising:

determining, based on sizes, for a level 3 matrix multiplication processing in which are involved three matrices, which matrix of said three matrices will have data for a submatrix block residing in a lower level cache of said computer and which two matrices of said three matrices will have data for submatrix blocks residing in at least one higher level cache or a memory, said lower level cache being closer to a processor of said computer than said higher level cache in said memory hierarchical structure; and streaming data from said two matrices to have data residing in said at least one higher level cache or memory, for executing said level 3 matrix multiplication processing, so that said submatrix block residing in said lower level cache remains resident in said lower level cache.

2. The method of claim 1, wherein said lower level cache comprises an L1 cache and said higher level cache comprises an L2 cache.

3. The method of claim 2, wherein data for said second matrix and said third matrix streams into said L1 cache from said L2 cache such that said data from said second matrix and said third matrix streams in a vector format into said L1 cache.

4. The method of claim 1, wherein said determining which matrix is to be stored in said lower level cache comprises determining which of the three matrices has a smallest size.

5. The method of claim 1, wherein said linear algebra subroutine comprises a substitute of a subroutine from LAPACK (Linear Algebra PACKage).

6. The method of claim 1, said computer having M, M being a natural number, levels of caches and a main memory, said method further comprising:
selecting, from a plurality of six kernels, two kernels optimal to use for executing said level 3 matrix multiplication processing as data streams from different levels of said M levels of cache, such that said processor switches back and forth between said two selected kernels as steaming data traverses said different levels of cache.

7. The method of claim 6, wherein said substitute of said subroutine comprises a BLAS (Basic Linear Algebra Subroutine) Level 3 routine or a BLAS Level 3 kernel routine.

8. An apparatus, comprising:
a memory system to store matrix data for a level 3 matrix multiplication processing using data from a first matrix, a second matrix, and a third matrix, said memory system including at least one cache; and
a processor to perform said level 3 matrix multiplication processing, wherein data from one of said first matrix, said second matrix, and said third matrix is stored as a submatrix block resident in a lower level cache in a matrix format and data from a remaining two matrices is stored as submatrix blocks in said memory system at a level in said memory system higher than said lower level cache, said lower level cache being closer to a processor of said computer than said higher level cache in a hierarchical structure of said memory system,
said processor preliminarily selecting, based on sizes, which matrix will have said submatrix block stored in said lower level cache and which said two matrices will have submatrix blocks stored in said higher level,
said data from said selected two matrices being streamed through said lower level cache into said processor, as required by said level 3 matrix multiplication processing, so that said submatrix block stored in said lower level cache remains resident in said lower level cache.

9. The apparatus of claim 8, wherein said processor selects a smallest of said first, second, and third matrices to be said matrix to have data residing in said first level cache.

10. The apparatus of claim 9, wherein said level 3 matrix multiplication comprises one or more subroutines substitute to subroutines from LAPACK (Linear Algebra PACKage).

11. The apparatus of claim 10, wherein said one or more substitute subroutine comprises a BLAS (Basic Linear Algebra Subroutine) Level 3 routine or a BLAS Level 3 kernel routine.

12. The apparatus of claim 8, wherein said computer comprises M, M being a natural number, levels of caches and a main memory, said processor further preliminarily selecting, from a plurality of six kernels, two kernels optimal to use for executing said level 3 matrix multiplication processing as data streams from different levels of said M levels of cache, such that said processor switches back and forth between said two selected kernels as steaming data traverses said different levels of cache.

13. A machine-readable storage medium tangibly embodying a program of machine-readable instructions executable by a digital processing apparatus to perform a method of improving at least one of a speed and an efficiency of executing a level 3 matrix multiplication processing on a computer having at least one lower level cache and one or more higher level caches or other higher level memory devices, said lower level cache being closer to a processor of said digital processing apparatus than said higher level cache, said level 3 matrix multiplication processing involving three matrices, said method comprising:
selecting, based on sizes, which matrix of said three matrices will have a submatrix block of data residing in said lower level cache and which two of said three matrices will have submatrix blocks of data residing in at least one said higher level cache or memory; and
streaming data from said two matrices selected to have data residing in said at least one higher level cache or memory, for said level 3 matrix multiplication processing, so that said submatrix block residing in said lower level cache remains resident.

14. The machine-readable storage medium of claim 13, wherein a smallest of said three matrices is selected as said matrix to have data to reside in said lower level cache.

15. The machine-readable storage medium of claim 13, wherein said level 3 matrix multiplication processing comprises a substitute of a subroutine from LAPACK (Linear Algebra PACKage).

16. The machine-readable storage medium of claim 15, wherein said substitute of said subroutine comprises a BLAS (Basic Linear Algebra Subroutine) Level 3 routine or a BLAS Level 3 kernel routine.

17. The machine-readable storage medium of claim 13, wherein said lower level cache comprises an L1 cache and data for said second matrix and said third matrix streams from said higher level such that said data from one of said second matrix and said third matrix streams in a vector format through said L1 cache.

18. The machine-readable storage medium of claim 13, said memory system including M, M being a natural number, levels of caches and a main memory, wherein said processor initially selects, from a plurality of six kernels, two kernels optimal to use for executing said level 3 matrix multiplication processing as data streams from different levels of said M levels of cache, such that said processor switches back and forth between said two selected kernels as steaming data traverses said different levels of cache.

* * * * *